H. M. HILLEGASS.
VALVE.
APPLICATION FILED MAY 5, 1909.

952,523.

Patented Mar. 22, 1910.
2 SHEETS—SHEET 1.

Witnesses:
Harry C. Hebig
John H. Reiss.

Inventor
Harry M. Hillegass
By his Attorneys
Dunn & Funk

H. M. HILLEGASS.
VALVE.
APPLICATION FILED MAY 5, 1909.

952,523.

Patented Mar. 22, 1910.

2 SHEETS—SHEET 2.

UNITED STATES PATENT OFFICE.

HARRY M. HILLEGASS, OF PHILADELPHIA, PENNSYLVANIA.

VALVE.

952,523.   Specification of Letters Patent.   Patented Mar. 22, 1910.

Application filed May 5, 1909. Serial No. 494,026.

*To all whom it may concern:*

Be it known that I, HARRY M. HILLEGASS, a citizen of the United States, residing at Philadelphia, in the county of Philadelphia and Commonwealth of Pennsylvania, have invented certain new and useful Improvements in Valves, of which the following is a full, clear, and exact specification.

My invention relates to valves and particularly to such valves as from the nature of their employment are required to be flexible, and in use frequently to be bent or flexed sidewise, such as pump valves for fire engine or other pumps and for condenser and dry dock valves. Such valves are usually made of rubber and may be held in contact with the convex center of a curved guard or backing, or may be held at one side, with or without a backing or guard. When pressure is applied to the valves, they yield at their free edges and are bent or flexed outwardly. These frequent and rapid changes in position, after a period of use, tend to weaken the valve, and gradually pieces of the valve will break off along the lines of curvature and will float and occasionally lodge on the valve seat, and thus prevent a perfect seating of the valve and occasion a leaky joint.

The object of my invention is to strengthen the construction of the valve so that thereby its life is lengthened, and further to reduce the likelihood of pieces of the valve becoming loosened and broken off, thereby producing an imperfect seating of the valve, and to this end my invention consists in embedding and vulcanizing in the rubber body of the valve a strip or strips of strengthening textile fabric, preferably cut bias, and having its threads arranged in lines inclined relatively to the lines of curvature of the valve. This textile fabric I prefer to insert in a helically-wound strip or in short strips. Said fabric is separated at its edges by the rubber, thereby presenting short threads, and has a considerable degree of flexibility or elasticity in itself. It is vulcanized to the rubber, thereby adhering firmly, and the intervals of rubber between the strips insures perfect adhesion of the sides of the valve. This is illustrated in the accompanying drawings wherein—

Figure 1:
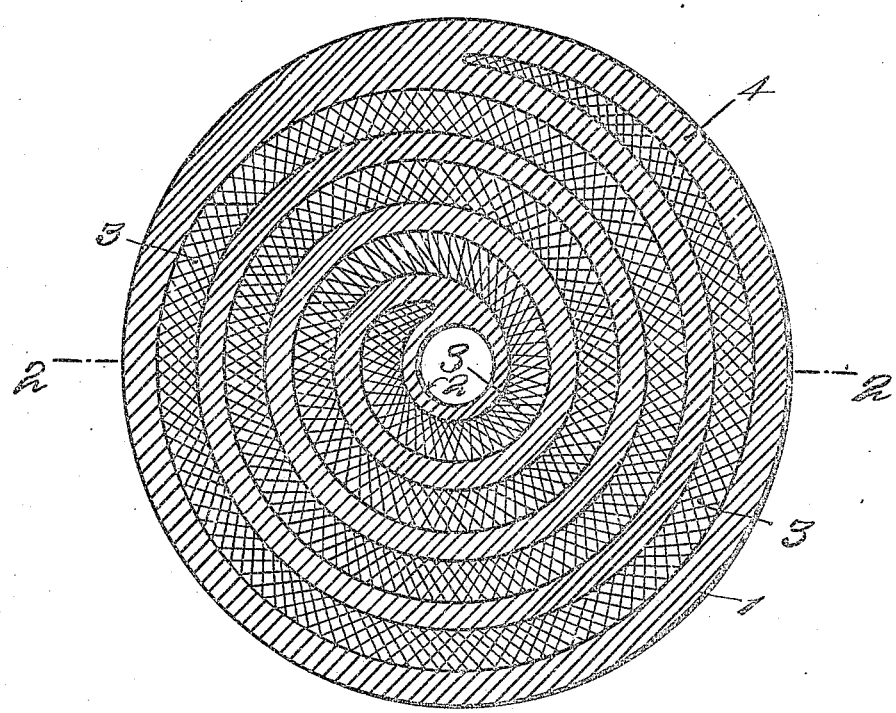
Figure 2:
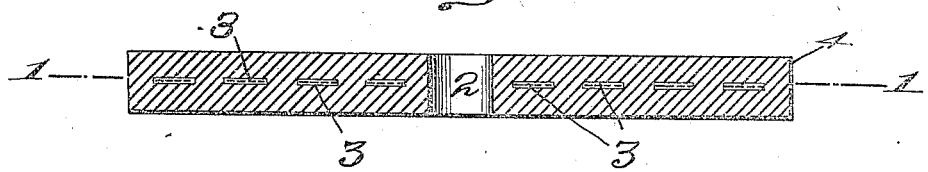
Figure 3:
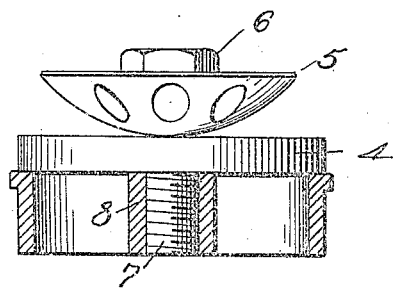
Figure 4:
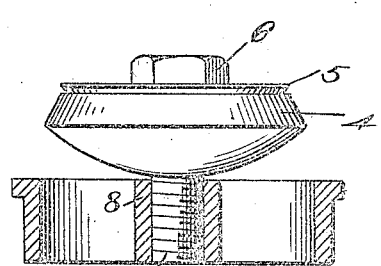
Figure 5:
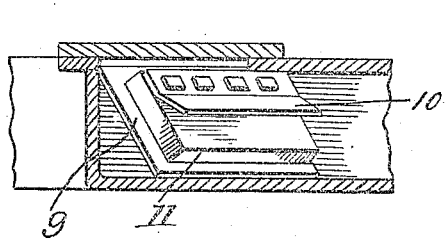
Figure 6:
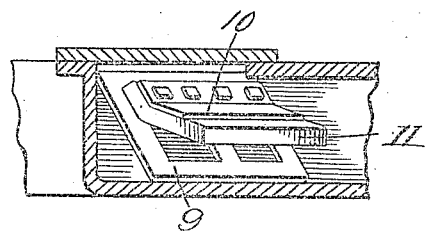

Figure 1 is a section on the line 1—1 of Fig. 2; and Fig. 2 a section on the line 2—2 of Fig. 1. Fig. 3 shows the valve of Fig. 1 in closed position; and Fig. 4 illustrates the same open. Fig. 5 illustrates another form of valve in closed position; and Fig. 6 illustrates the same open.

The body 1 of my improved valve is made of flexible rubber or similar flexible and resilient material suitable to the purpose and capable of adhering firmly to the fabric. It may be provided with an aperture at 2, to permit the passage of a stem or other means to hold the valve in place, and may be made circular in form; or the aperture may be omitted and the valve otherwise held. Within the said body 1, I embed a strip 3, of cotton duck or other suitable material, which is cut on the bias, whereby the threads, both warp and weft, are at an angle of substantially forty-five degrees to the longitudinal axis of the said strip. This strip is then preferably coiled in a substantially helical form, as illustrated in Fig. 1. A substantial space 4 is left between the edges of the strip and through this space the body of the rubber packing extends, thereby insuring a firm adhesion between the respective sides of the packing. The strip 3 may be inserted in place between the rubber sheets composing the upper and lower sides of the packing prior to vulcanization, and when the same has been vulcanized it will be found that the two sides will be integral in the space 4, and that the rubber will intimately embrace the fibers of the strip 3 and be firmly attached thereto, thereby insuring a firm and intimate contact of both sides of the valve. I prefer to employ a strip of fabric separated at its edges, because thereby I am enabled to secure more perfect adhesion of the two sides through the integral rubber connection 4, and I preferably cut this fabric on the bias for the greater flexibility thereby afforded to the valve. Were a solid layer of fabric introduced, not only would there be danger of the two sides separating, but the flexibility of the valve would be reduced, owing to the fact that many of the threads would lie in lines parallel with the lines of curvature, as, for instance, in the circular valve, in radial lines, and such threads would probably become broken, permitting the condition to exist which I overcome. By the coiling of the straight bias strip 3 in a helical coil, as shown, all of the threads lie in lines inclined to the radius of the valve, and they are also quite short, so that the flexing of the valve in use does not strain the threads. Through these features it will be found that the flexibility and elasticity of the valve is not noticeably reduced, whereas its strength is greatly increased and the propensity for fragments to break off and flow away is reduced, as the particles will adhere to the fabric strip.

In Fig. 3 my valve is illustrated in position for use in a pump as for fire engines. Here it is held against a curved guard 5, which is secured in position by head 6, of bolt 7, entering threaded socket 8, and the valve in use is curved outward against the curved guard, as seen in Fig. 4.

In Fig. 5 the valve 11 is of oblong shape and is illustrated as applied to a clapper-valve, where the valve, when closed (as in Fig. 5), covers the ports 9, and when open is bent against guard-plate 10.

I have illustrated one embodiment of my invention, and it is possible to modify the same or add thereto without departing from its principle. For instance, two such bias strips might be employed extending in opposite directions, or in place of one continuous strip, it might be separated at intervals.

I claim:

1. A valve composed of flexible and elastic material having embedded therein a strip of bias textile fabric so disposed that all its threads are inclined relative to the line of curvature of said valve, substantially as described.

2. A valve composed of flexible and elastic material having embedded therein a strip of bias textile fabric separated at the edges, and having said flexible and elastic material interposed between said edges.

3. A valve composed of flexible and elastic material having embedded at intervals therein textile fabric with all its threads at an angle to the radius of said valve.

4. A valve composed of flexible and elastic material having embedded at intervals therein bias textile fabric arranged helically.

5. A valve composed of flexible and elastic material having embedded therein a strip of bias textile fabric arranged helically.

6. A valve composed of flexible and elastic material having embedded therein a strip of bias fabric arranged helically and having its edges separated by said flexible and elastic material.

7. A valve composed of flexible rubber having embedded at intervals therein bias textile fabric arranged helically.

8. A valve composed of flexible rubber having embedded therein a strip of bias fabric arranged helically.

9. A valve composed of flexible rubber having embedded therein a strip of bias fabric arranged helically and having its edges separated by said rubber.

10. A valve composed of flexible rubber having embedded at intervals therein textile fabric with all its threads at an angle to the radius of said valve.

11. A valve composed of flexible rubber having embedded therein a strip of fabric arranged helically and with its threads at an angle to the radius of said valve.

12. A valve composed of flexible rubber having embedded therein a strip of fabric arranged helically, with its threads at an angle to the radius of said valve, and having its edges separated by said rubber.

13. A valve composed of flexible rubber having embedded at intervals therein bias textile fabric, so disposed that all its threads are inclined relative to the line of curvature of said valve.

14. A valve composed of flexible rubber having embedded at intervals therein pieces of textile fabric with their threads inclined relative to the line of curvature of said valve, said pieces being separated at their edges by said rubber.

In testimony whereof, I have hereunto set my hand in the presence of two subscribing witnesses.

HARRY M. HILLEGASS.

Witnesses:
   ALONZO P. BROADBENT,
   ROBERT BROMILEY, Jr.